US008523075B2

(12) United States Patent
van der Merwe

(10) Patent No.: US 8,523,075 B2
(45) Date of Patent: Sep. 3, 2013

(54) BARCODE RECOGNITION USING DATA-DRIVEN CLASSIFIER

(75) Inventor: Rudolph van der Merwe, Portland, OR (US)

(73) Assignee: Apple Inc., Cupertino, CA (US)

( * ) Notice: Subject to any disclaimer, the term of this patent is extended or adjusted under 35 U.S.C. 154(b) by 404 days.

(21) Appl. No.: 12/895,751

(22) Filed: Sep. 30, 2010

(65) Prior Publication Data

US 2012/0080515 A1 Apr. 5, 2012

(51) Int. Cl.
*G02B 26/10* (2006.01)

(52) U.S. Cl.
USPC .................................. 235/462.25; 235/435

(58) Field of Classification Search
USPC ................... 235/462.01–462.49
See application file for complete search history.

(56) References Cited

U.S. PATENT DOCUMENTS

| | | | |
|---|---|---|---|
| 5,949,053 A | 9/1999 | Zlotnick | |
| 6,021,220 A | 2/2000 | Anderholm | |
| 6,081,620 A | 6/2000 | Anderholm | |
| 6,993,573 B2 | 1/2006 | Hunter | |
| 7,051,935 B2 * | 5/2006 | Sali et al. | 235/462.04 |
| 7,210,631 B2 * | 5/2007 | Sali et al. | 235/462.04 |
| 7,237,721 B2 | 7/2007 | Bilcu et al. | |
| 7,356,254 B2 | 4/2008 | Aoyama | |
| 7,636,486 B2 | 12/2009 | Steinberg et al. | |
| 7,639,889 B2 | 12/2009 | Steinberg et al. | |
| 7,660,478 B2 | 2/2010 | Steinberg et al. | |
| 7,676,108 B2 | 3/2010 | Steinberg et al. | |
| 7,680,620 B2 | 3/2010 | Umeda | |
| 7,689,615 B2 | 3/2010 | Burges et al. | |
| 7,697,778 B2 | 4/2010 | Steinberg et al. | |
| 7,979,298 B2 | 7/2011 | Cheng et al. | |
| 8,049,812 B2 | 11/2011 | Whillock et al. | |
| 8,049,813 B1 | 11/2011 | Huang et al. | |
| 8,090,246 B2 | 1/2012 | Jelinek | |
| 8,098,901 B2 | 1/2012 | Hamza | |
| 8,102,314 B2 | 1/2012 | Bamberger et al. | |
| 2003/0002746 A1 | 1/2003 | Kusaka | |
| 2003/0076408 A1 | 4/2003 | Dutta | |
| 2003/0130035 A1 | 7/2003 | Kanarat | |
| 2004/0004125 A1 | 1/2004 | Havens et al. | |
| 2004/0078351 A1 | 4/2004 | Pascual-Marqui et al. | |
| 2005/0258249 A1 | 11/2005 | Giebel et al. | |
| 2006/0091221 A1 | 5/2006 | He et al. | |
| 2006/0100958 A1 | 5/2006 | Cheng et al. | |
| 2006/0101106 A1 | 5/2006 | Subbarao | |
| 2006/0195440 A1 | 8/2006 | Burges et al. | |
| 2006/0213999 A1 | 9/2006 | Wang et al. | |
| 2007/0072250 A1 | 3/2007 | Kim et al. | |
| 2007/0073502 A1 | 3/2007 | Umeda | |

(Continued)

OTHER PUBLICATIONS

C. S. Turner, "Slope filtering: An FIR approach to linear regression," *IEEE Signal Processing Magazine*, vol. 25, No. 6, pp. 159-163, 2008, 4 pages.

Flusser et al., "Recognition of Blurred Images by the Method of Moments," IEEE Transactions on Image Processing, vol. 5, No. 3, Mar. 1996, pp. 533-538.

(Continued)

*Primary Examiner* — Christle Marshall
(74) *Attorney, Agent, or Firm* — Fish & Richardson P.C.

(57) ABSTRACT

A barcode decoding system and method are disclosed that use a data-driven classifier for transforming a potentially degraded barcode signal into a digit sequence. The disclosed implementations are robust to signal degradation through incorporation of a noise model into the classifier construction phase. The run-time computational cost is low, allowing for efficient implementations on portable devices.

40 Claims, 13 Drawing Sheets

(56) References Cited

U.S. PATENT DOCUMENTS

| | | |
|---|---|---|
| 2007/0081729 A1 | 4/2007 | Ogawa |
| 2007/0175998 A1 | 8/2007 | Lev |
| 2007/0201757 A1 | 8/2007 | Madej et al. |
| 2008/0044103 A1 | 2/2008 | Dowski et al. |
| 2008/0215401 A1 | 9/2008 | Cheng et al. |
| 2009/0277962 A1 | 11/2009 | McCloskey |
| 2009/0278928 A1 | 11/2009 | McCloskey |
| 2010/0103048 A1 | 4/2010 | Bamberger et al. |
| 2010/0182440 A1 | 7/2010 | McCloskey |
| 2010/0187311 A1 | 7/2010 | van der Merwe et al. |
| 2010/0189367 A1 | 7/2010 | van der Merwe et al. |
| 2010/0220896 A1 | 9/2010 | McCloskey et al. |
| 2011/0073650 A1 | 3/2011 | Chiou et al. |
| 2012/0014604 A1 | 1/2012 | Gaubatz et al. |
| 2012/0048937 A1 | 3/2012 | Dahari |

OTHER PUBLICATIONS

"Finding the Barcode: Top-level description of barcode detection algorithm," Jon's Java Imaging Library (jjil), for mobile image processing [Online], updated Mar. 11, 2008, [Retrieved on Apr. 8, 2009]; Retrieved from the Internet: URL: http://code.google.com/p/jjil/wiki/FindingTheBarcode; 2 pages.

Whitley, "A Genetic Algorithm Tutorial", Technical Report CS-93-103 (Revised), Nov. 10, 1993, Department of Computer Science, Colorado State University, 38 pages.

Bishop, et al. "Developments of the Generative Topographic Mapping" Nearocomputing 21 (1998) pp. 1-19.

Tapia, et al. "Recogniation of On-Line Handwritten Mathematical Expressions in the E-Chalf System An Extension" IEEE Conference on Document Analysis and Recognition (ICDAR) 2005, pp. 105.

Tappert, et al. "On-Line Handwriting Recognition—A Survey" IEEE (1988) pp. 1-10.

\* cited by examiner

| Symbol Value | Symbol Set A (Odd Parity) | Symbol Set B (Even Parity) | Symbol Set C (Even Parity) |
|---|---|---|---|
| 0 |  |  |  |
| 1 |  |  |  |
| 2 |  |  |  |
| 3 |  |  |  |
| 4 |  |  |  |
| 5 |  |  |  |
| 6 |  |  |  |
| 7 |  |  |  |
| 8 |  |  |  |
| 9 |  |  |  |

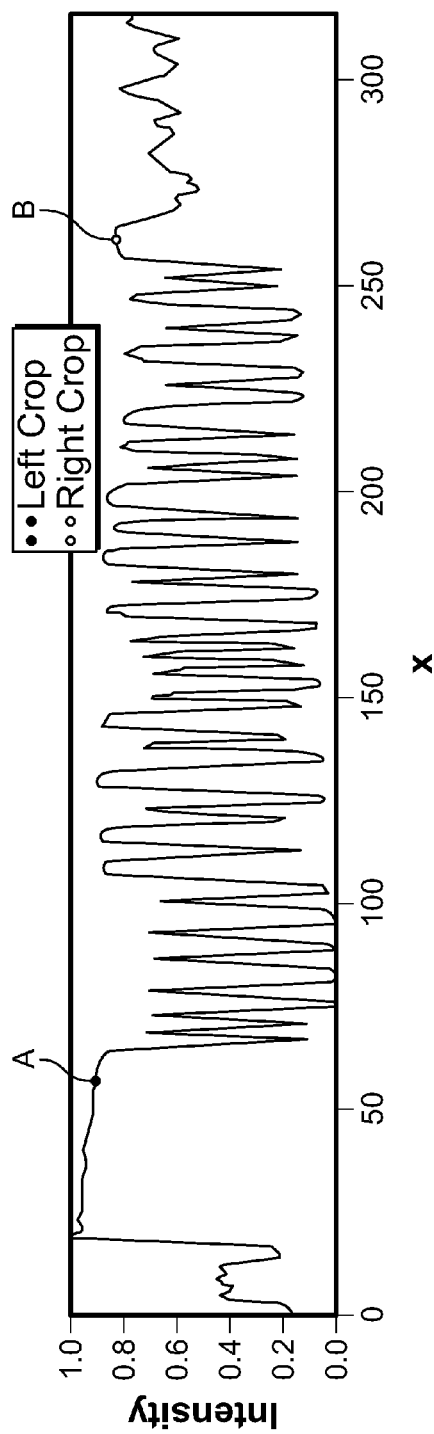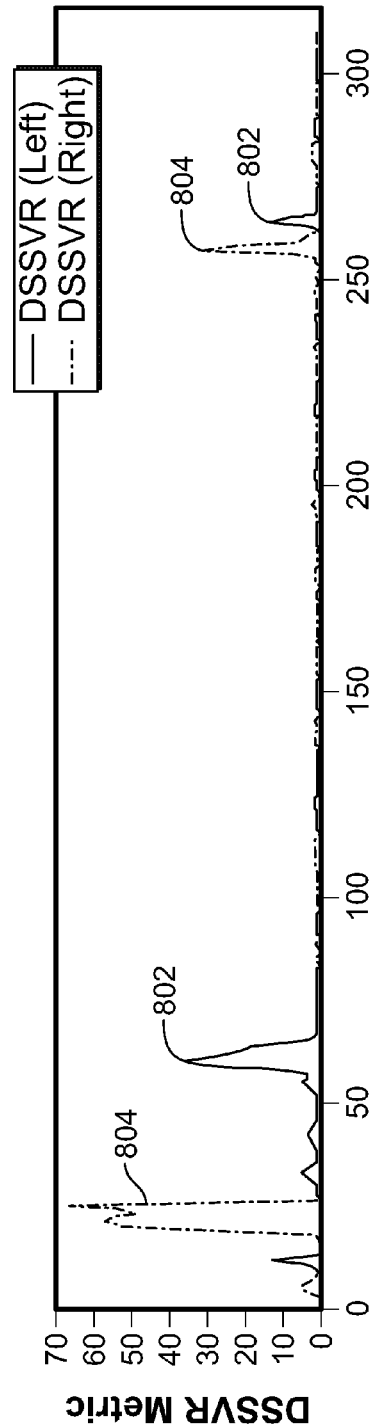
FIG. 8A
FIG. 8B

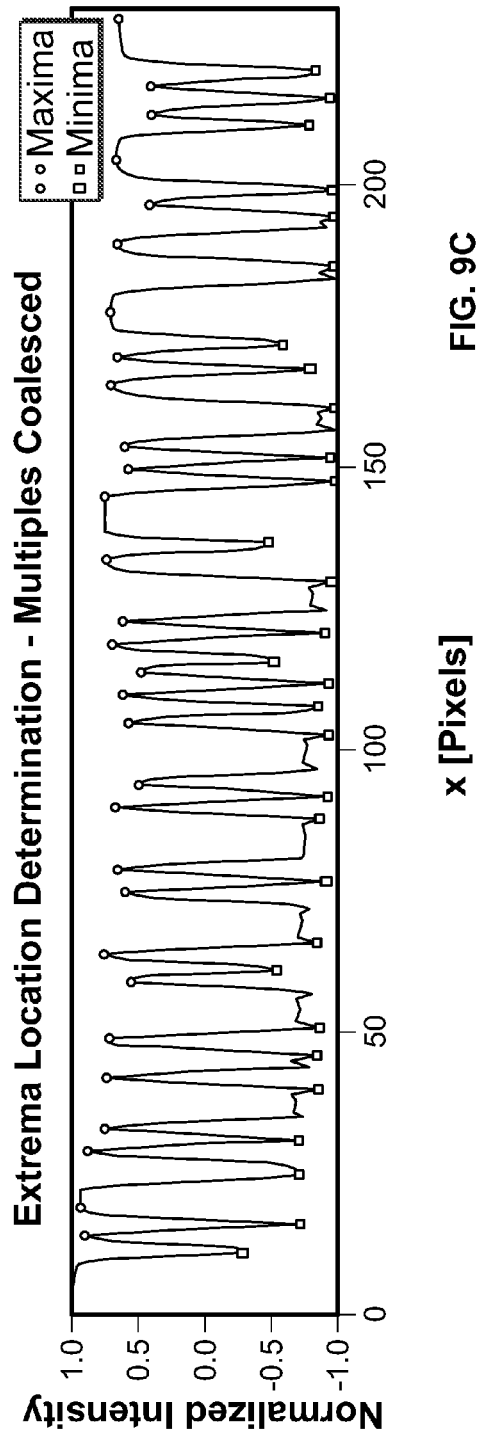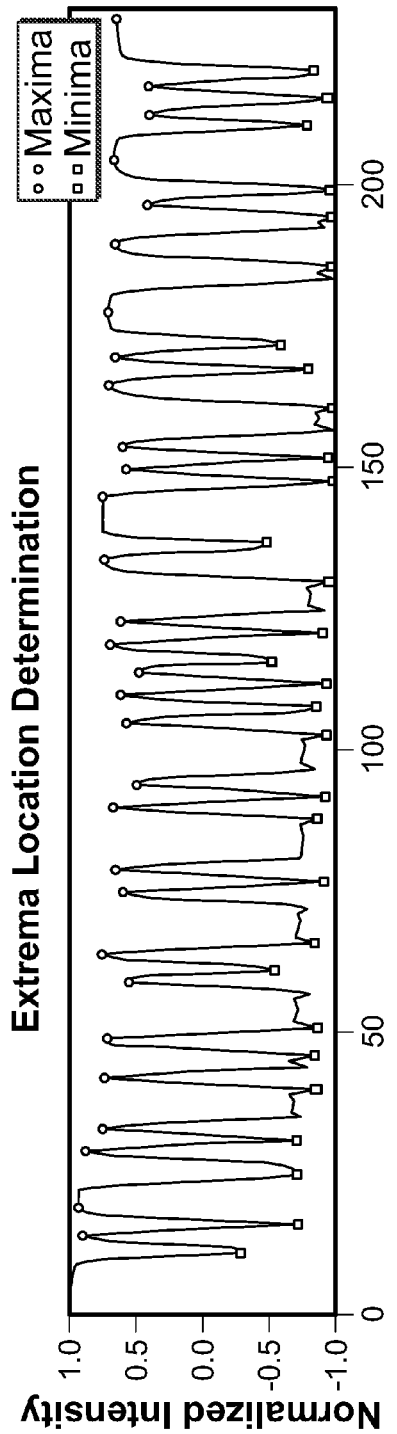

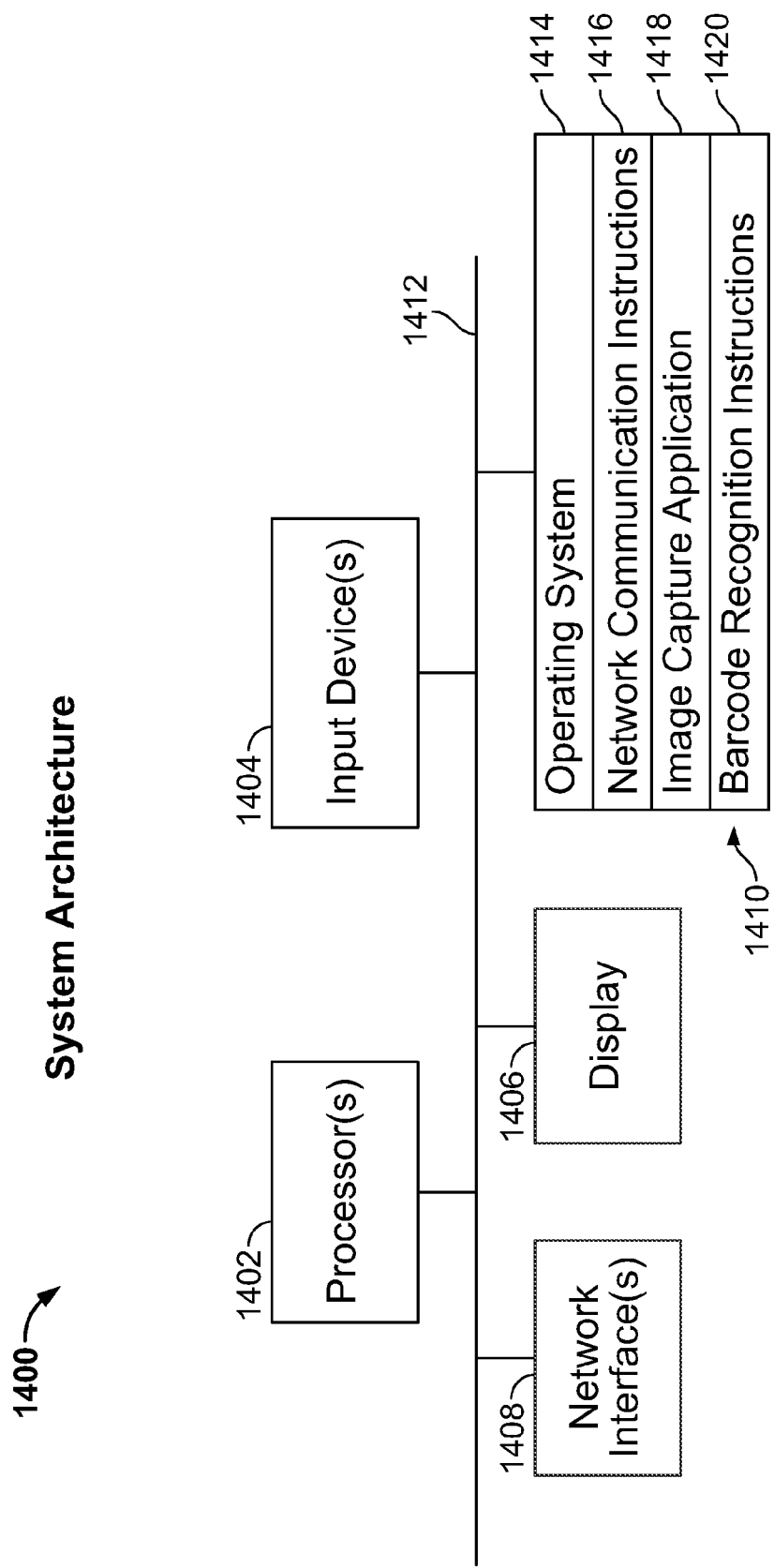

BARCODE RECOGNITION USING DATA-DRIVEN CLASSIFIER

TECHNICAL FIELD

The disclosure generally relates to decoding barcodes captured in digital images.

BACKGROUND

The use of one dimensional barcodes on consumer products and product packaging has become nearly ubiquitous. These barcodes linearly encode a numerical digit sequence that uniquely identifies the product to which the barcode is affixed. The ability to accurately and quickly decode barcodes under a variety of conditions on a variety of devices poses a number of interesting design challenges. For example, a barcode recognition algorithm must be able to extract information encoded in the barcode robustly under a variety of lighting conditions. Furthermore, the computational cost of signal processing and decoding needs to be low enough to allow real-time operation of barcode recognition on low-powered portable computing devices such as smart phones and electronic tablet computers.

SUMMARY

A barcode decoding system and method are disclosed that use a data-driven classifier for transforming a potentially degraded barcode signal into a digit sequence. The disclosed implementations are robust to signal degradation through incorporation of a noise model into the classifier construction phase. The run-time computational cost is low, allowing for efficient implementations on portable devices.

In some implementations, a method of recognizing a barcode includes: converting a barcode image into an electronic representation. Symbol feature vectors are extracted from the electronic representation to form a symbol feature vector sequence. The sequence of symbol feature vectors is mapped into a digit sequence using a robust classifier. The classifier is trained in a supervised manner from a dataset of simulated noisy symbol feature vectors with a known target class.

Other implementations directed to methods, systems and computer readable mediums are also disclosed. The details of one or more implementations are set forth in the accompanying drawings and the description below. Other features, aspects, and potential advantages will be apparent from the description, drawings and claims.

DESCRIPTION OF DRAWINGS

FIGS. 8A and 8B are plots illustrating the determining of left and right cropping points for the barcode intensity profile of FIG. 7 using a differential spatial signal variance ratio (DSSVR) metric.
FIGS. 9A-9C are plots illustrating extrema location determination.
FIGS. 10A and 10B are plots illustrating positive and negative edge locations of a barcode intensity profile.
FIG. 14 is a block diagram of an exemplary system architecture implementing a barcode decoding system according to FIGS. 1-13.

Like reference symbols in the various drawings indicate like elements.

DETAILED DESCRIPTION

Barcode Encoding Overview

A barcode is an optical machine-readable representation of data about a product to which the barcode is affixed. Barcodes that represent data in the widths of bars and the spacings of parallel bars are referred to as linear or one dimensional (1D) barcodes or symbologies. One dimensional barcodes can be read by optical scanners called barcode readers or scanned from a digital image. One dimensional barcodes have a variety of applications, including but not limited to automating supermarket checkout systems and inventory control. Some software applications allow users to capture digital images of barcodes using a digital image capture device, such as a digital camera or video camera. Conventional applications perform processing on the digital image to isolate the barcode in the image so that it can be decoded. Such applications, however, cannot accurately and quickly decode barcodes under a variety of conditions on a variety of devices.

Figure 1B:
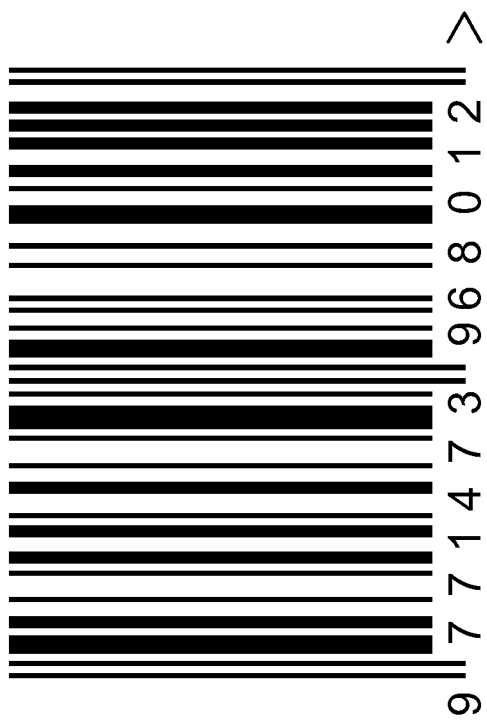
FIG. 1B illustrates a UPC-A one dimensional barcode.
Figure 1A:
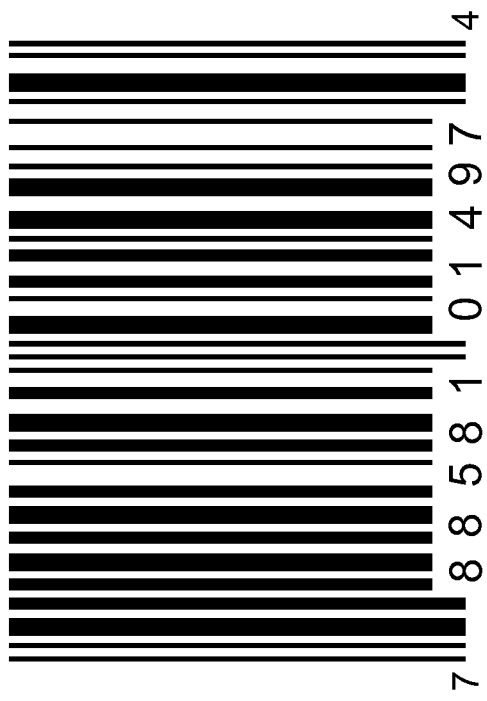
FIG. 1A illustrates an EAN-13 one dimensional barcode.

One dimensional barcodes, such as those barcodes covered by the GS1 General Specifications (Version 10), encode individual numbers of a digit sequence using a linear sequence of parameterized symbols. FIG. 1A illustrates an EAN-13 one dimensional barcode. FIG. 1B illustrates a UPC-A one dimensional barcode, which is a subset of the EAN-13 standard.

Figure 2:
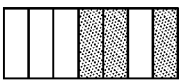
FIG. 2 is an EAN/UPC barcode symbol alphabet.
Figure 2:
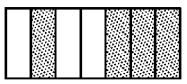
Figure 2:
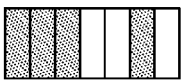
Figure 2:
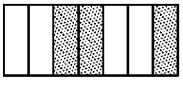
Figure 2:
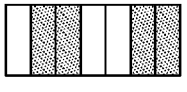
Figure 2:
Figure 2:
Figure 2:
Figure 2:
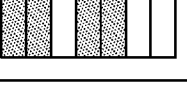
Figure 2:
Figure 2:
Figure 2:
Figure 2:
Figure 2:
Figure 2:
Figure 2:
Figure 2:
Figure 2:
Figure 2:
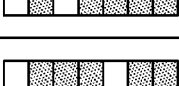
Figure 2:
Figure 2:
Figure 2:
Figure 2:
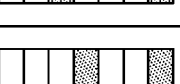
Figure 2:
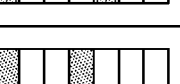
Figure 2:
Figure 2:
Figure 2:
Figure 2:
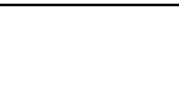
Figure 2:
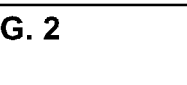
Figure 2:
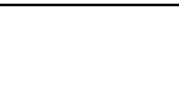

FIG. 2 is an EAN/UPC barcode symbol alphabet. Three symbol sets are used to encode the numerical digits of the barcode, as described in the GS1 General Specifications. Each symbol is composed of two light and two dark interleaved bars of varying widths. Typically, black is used for the dark bars and white for the light bars, however, any two high contrast ratio colors can be used. The order of the interleaving, white-black-white-black or black-white-black-white depends on the specific symbol set and encoding parity being used for a given numeric digit.

Figure 3B:
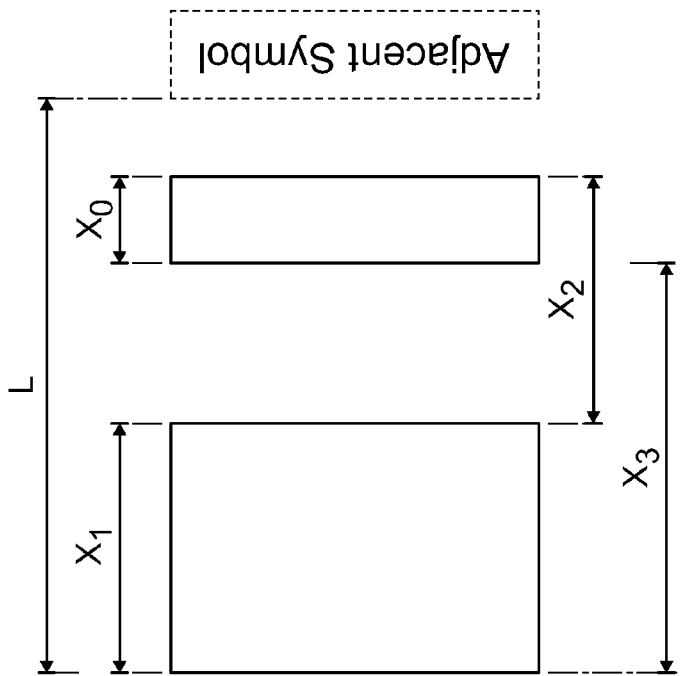
FIGS. 3A-3B illustrate exemplary EAN/UPC barcode symbol encoding.
Figure 3A:
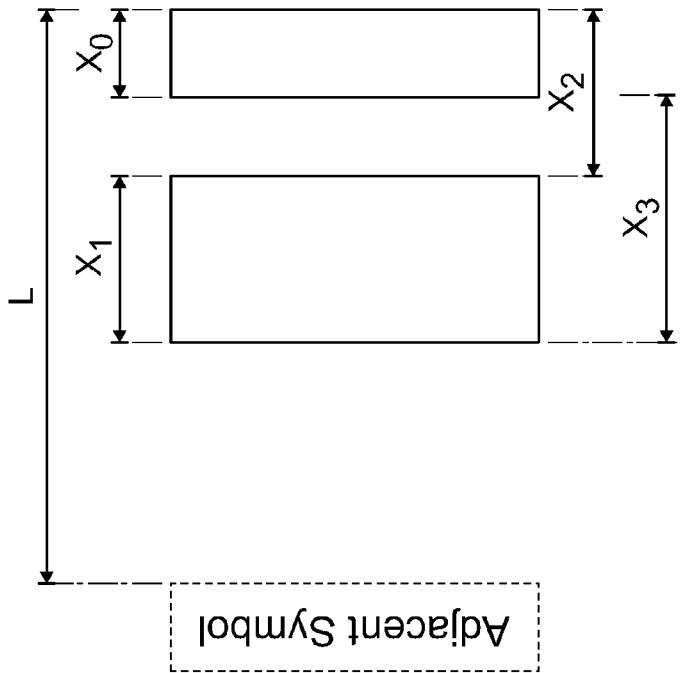

FIGS. 3A and 3B illustrate exemplary EAN/UPC barcode symbol encoding. Barcode digit symbols are parameterized using five salient parameters ($L, x_0, x_1, x_2, x_3$) that encode the distances between key fiducial landmarks in the pictorial representation of the barcode. These parameters are:

L: Symbol length measures from the leading edge of the first bar (dark or light) of a symbol to the corresponding leading edge of the first bar of the next adjacent symbol.
$x_0$: Width of the second dark (black) bar.

$x_1$: Width of the first dark (black) bar.

$x_2$: Distance between the trailing edges of the two dark (black) bars.

$x_3$: Distance between the leading edges of the two dark (black) bars.

Barcode Decoding Overview

Figure 4:
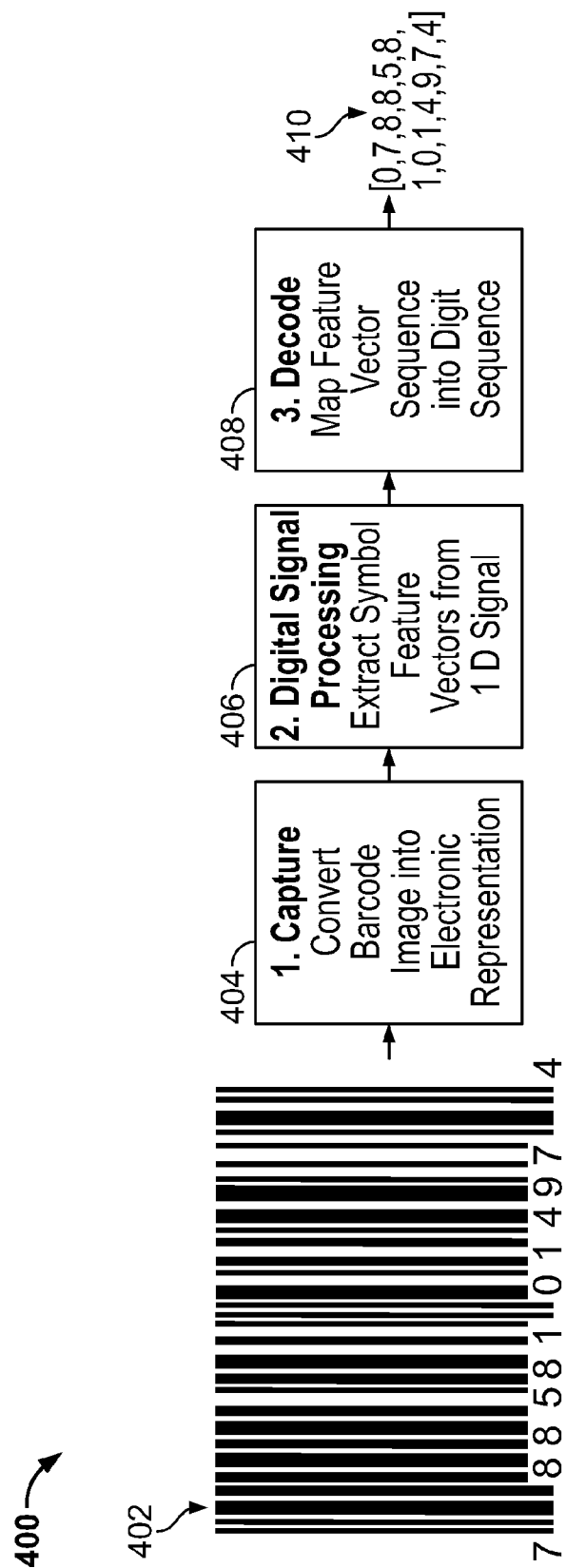
FIG. 4 is a high-level block diagram of an exemplary barcode decoding system.

FIG. 4 is a high-level block diagram of an exemplary barcode decoding system 400. Decoding a barcode from its pictorial representation is usually a three-step process that includes capture, digital signal processing and decoding. For example, an image of a barcode 402 can be captured by a digital image capture device and converted into an electronic representation (404). The electronic representation can be digital or analog. The electronic representation (e.g., a 1D signal) is processed (406). The processing can include converting the electronic representation into a linear sequence of N symbol feature vectors $\{\vec{s}_0, \vec{s}_1, \ldots, \vec{s}_N\}$, where $\vec{s}_i = [L_i, x_{i,0}, x_{i,1}, x_{i,2}, x_{i,3}]$ and $i=0, 1, \ldots, N-1$. The sequence of symbol feature vectors is decoded (408) by mapping the symbol feature vectors into a corresponding digit sequence 410 using the relevant symbol alphabet shown in FIG. 2.

A hardware digital image capture device, such as a dedicated laser scanner or a digital camera can be used for step 404. Steps 406, 408 can be implemented using digital signal processing (DSP) hardware and/or software running on a general purpose CPU, such as the architecture shown in FIG. 14.

Exemplary Barcode Capture & Conversion

There are a variety of ways in which a pictorial representation of a 1D barcode can be converted into a 1D electronic signal in step 404 of barcode decoding system 400. Laser scanners, either hand-held or fixed, have traditionally been the method of choice for barcode entry and is still widely used in point-of-sell retail venues such as supermarkets. Now that computationally powerful mobile devices (e.g., smart phones) have become ubiquitous, using the built-in digital camera as a means of barcode capture and entry have become popular. Under a camera-based scenario, one has to differentiate between techniques that operate on low quality (often blurry) photos from older fixed focus mobile phone cameras that have poor macro performance, and those cameras that use high quality macro-focused images originating from auto-focus cameras. A technique for decoding blurry barcodes using a genetic process is disclosed in U.S. patent application Ser. No. 12/360,831, for "Blurring Based Content Recognizer."

Figure 5:
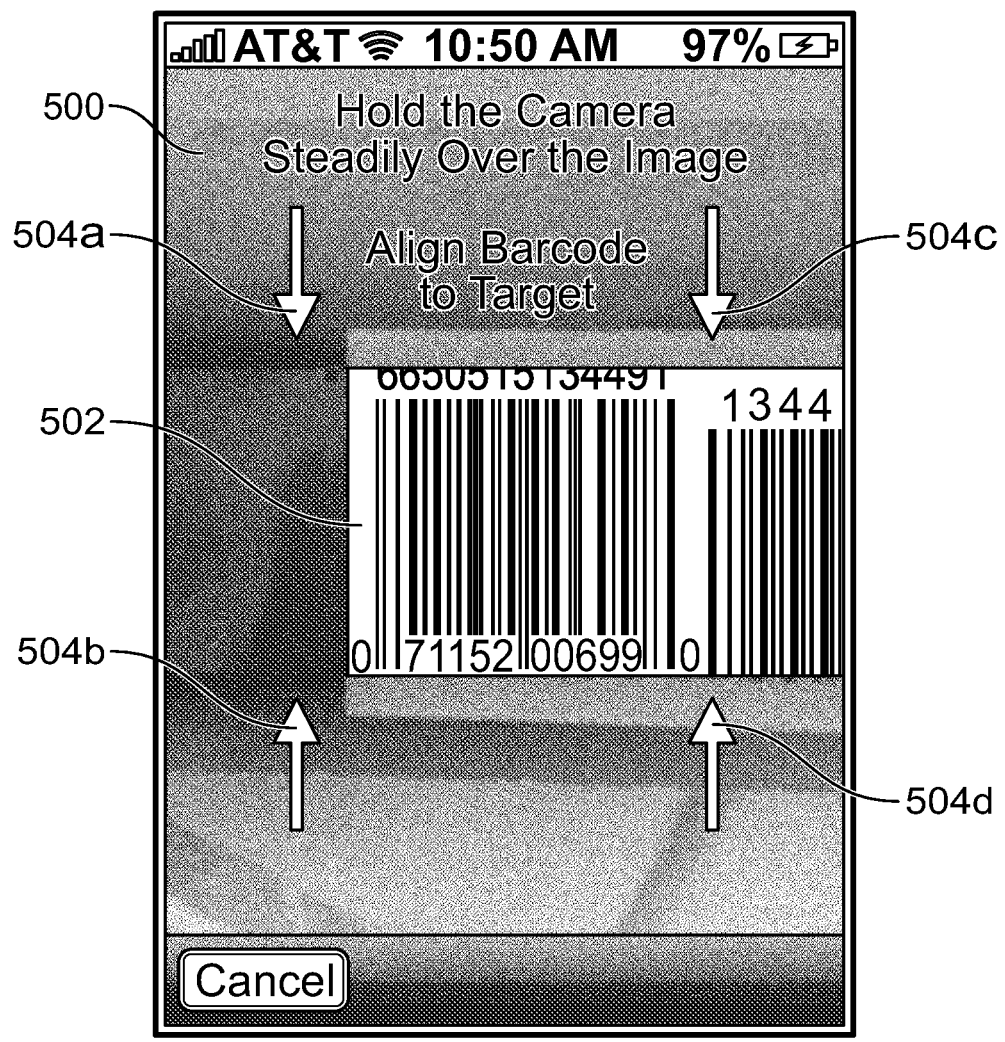
FIG. 5 illustrates an exemplary process for manual targeting of a barcode using a target guide overlaid on top of a live preview screen.

FIG. 5 illustrates an exemplary process for manual targeting of a barcode using a target guide overlaid on top of a live preview screen. In some implementations, a barcode 502 is located and cropped from a live video preview screen 500 of an auto-focus camera. The cropping can be performed manually by presenting the user with target guides 504a-504d overlaid on the live video preview screen 500. The user aligns the barcode between the target guides 504 and captures a video frame from the live video preview screen 500. An alternative technique for automated barcode location determination using an automated barcode location determination process is disclosed in U.S. patent application Ser. No. 12/360,831, for "Blurring Based Content Recognizer."

Figure 6:
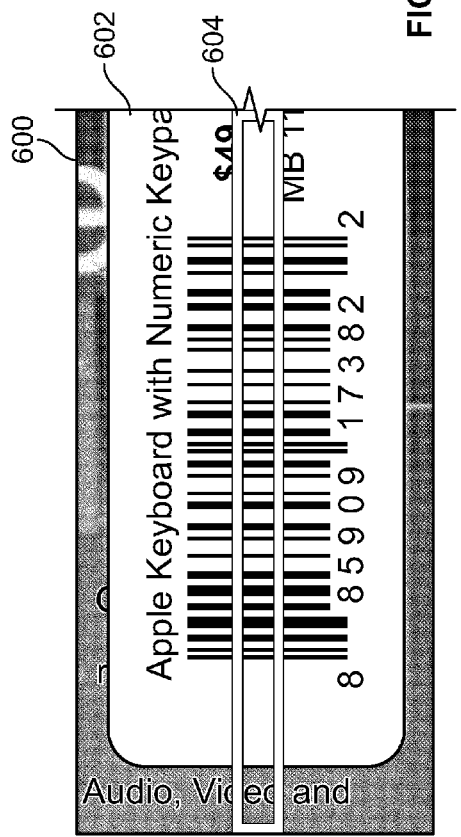
FIG. 6 illustrates a typical area of pixels which can be vertically integrated to generate a one dimensional intensity profile.
Figure 7:
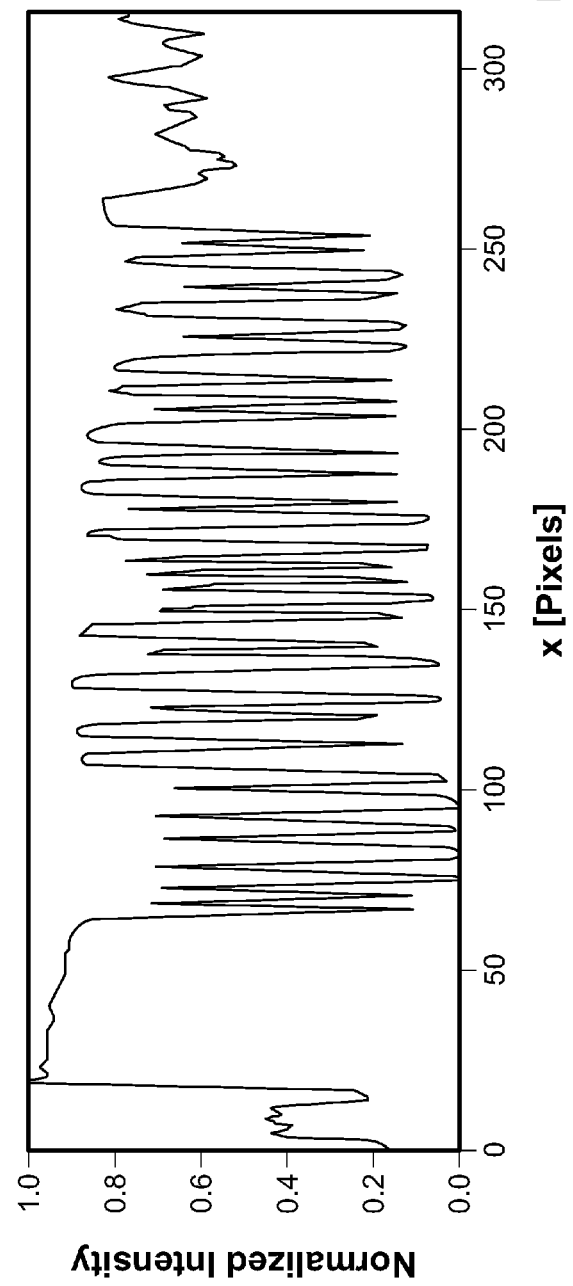
FIG. 7 is a plot of an exemplary one dimensional intensity profile generated by integrating the luminance value of the pixels inside the bounding box of FIG. 6.

Once the barcode has been located, the pixel values in a horizontal band cutting through the vertical center of the barcode are vertically integrated to generate a one dimensional intensity profile. FIG. 6 illustrates a typical area of pixels which can be vertically integrated to generate a one dimensional intensity profile. In the example shown, a barcode 602 on a live video preview screen 600 has a bounding box 604 indicating an area of pixels which is vertically integrated to generate a one dimensional intensity profile FIG. 7 is a plot of an exemplary one dimensional intensity profile generated by integrating the luminance value of the pixels inside the bounding box of FIG. 6. In some implementations, the luminance value of the pixels within bounding box 604 (e.g., Y channel of YUV color space) can be integrated. In some implementations, the average gray value can be used, which is the average of the red, green and blue pixel intensities, i.e., gray=(R+G+B)/3. One can also use any other linear or non-linear combination of the three R(red), G(green) and B(blue) channels for each pixel to generate a one dimensional intensity like signal. The number of scan lines that are integrated is a ion of the vertical resolution of the input image containing the barcode. Bounding box 604 indicates a typical region of pixels which is vertically integrated, and FIG. 7 shows the resulting intensity profile (normalized). The three channel RGB pixel values can be first converted into a single scalar pixel value before vertical integration. This conversion can be done with a linear (or nonlinear) colorspace mapping function such as RGB→YUV. The luminance intensity profile shown in FIG. 7 can be calculated by the formula $$Y(x) = \sum_{y=-\frac{h}{2}}^{\frac{h}{2}-1} P_Y(x, y) \qquad [1]$$

where $P_Y(x, y)$ is the image Y value (luminance intensity) at pixel coordinates (x, y), and h is the height of the integration slice measured in pixels.

Exemplary Digital Signal Processing

In the DSP phase of barcode recognition (step 406 of FIG. 4), the one dimensional intensity profile of the captured barcode is converted into a linear sequence of symbol feature vectors. As such, the DSP step 406 can be general in application and can operate on 1D image intensity profiles captured by any means (e.g., laser scanner, digital camera).

In some implementations, the substeps of step 406 are:
1. Crop left and right edges of intensity profile to barcode guard bars.
2. Identify the position and value of extrema (local maxima and minima) of intensity profile.
3. Filter list of extrema to remove extraneous detections.
4. Calculate locations of edges (positive or negative) of intensity profile using list of extrema.
5. Perform edge consistency checking.
6. Sequentially convert consecutive local edge location measurements into a linear sequence of N symbol feature vectors $\{\vec{s}_0, \vec{s}_1, \ldots, \vec{s}_N\}$, where $\vec{s}_i = [L_i, x_{i,0}, x_{i,1}, x_{i,2}, x_{i,3}]$ and $i=0, 1, \ldots, N-1$, as described in reference to FIGS. 3A and 3B.

Intensity Profile Cropping

To accurately and robustly convert the intensity profile into a sequence of barcode symbol features vectors, the left and right hand parts of the intensity profile that do not contain barcode relevant information can be removed. This can be achieved by determining the location where the barcode starts and stops.

In some implementations, barcode endpoints can be detected using a differential spatial signal variance ratio (DSSVR) metric. The DSSVR metric profiles (left and right) of the intensity profile can be determined over a sliding window of length $L_v$ by calculating the ratios of the signal variance over the left and right half-windows, that is, $$DSSVR_L(x) = \begin{cases} \dfrac{\sum_{n=0}^{\frac{L_v}{2}} (Y(x+n) - \overline{Y}_R(x))^2}{\sum_{n=0}^{\frac{L_v}{2}} (Y(x-n) - \overline{Y}_L(x))^2} & \text{if } \overline{Y}_L(x) > \overline{Y}_R(x) \\ 0 & \text{if } \overline{Y}_L(x) \le \overline{Y}_R(x), \end{cases} \quad [2]$$

$$DSSVR_R(x) = \begin{cases} \dfrac{\sum_{n=0}^{\frac{L_v}{2}} (Y(x-n) - \overline{Y}_L(x))^2}{\sum_{n=0}^{\frac{L_v}{2}} (Y(x+n) - \overline{Y}_R(x))^2} & \text{if } \overline{Y}_R(x) > \overline{Y}_L(x) \\ 0 & \text{if } \overline{Y}_R(x) \le \overline{Y}_L(x), \end{cases} \quad [3]$$

where $$\overline{Y}_R(x) = \sum_{n=0}^{L_v/2} Y(x+n) \quad [4]$$

$$\overline{Y}_L(x) = \sum_{n=0}^{L_v/2} Y(x-n). \quad [5]$$

These two variance ratios of equations [2] and [3] are reciprocals of each other.

FIGS. 8A and 8B are plots illustrating the determining of left and right cropping locations for the barcode intensity profile of FIG. 7 using the DSSVR metric. The top plot of FIG. 8 shows the intensity profile using the DSSVR metric and the dots at A and B indicate the optimal left and right cropping locations, respectively, determined from filtered peaks of left and right DSSVR metrics shown in the bottom plot of FIG. 8. The maximal peaks of $DSSVR_L$ 802 and $DSSVR_R$ 804 in the left halve (left edge to middle of profile space) and right halve (right edge to middle of profile space) of the profile space, respectively, can be used to determine the optimal left and right crop locations A and B.

The left crop location A can be placed a fixed distance $\delta$ to the left of the left local maximal peak of $DSSVR_L$ 802, and likewise, the right crop location B to the right of the local maximal peak of $DSSVR_R$ 804. The value of $\delta$ can be set to $\delta = \alpha * P$ where P is the nominal pitch of the intensity profile. The nominal pitch can be determined from the dominant frequency peak in the Fourier transform of the intensity profile.

Find Extrema of Cropped Intensity Profile

Figure 9A:
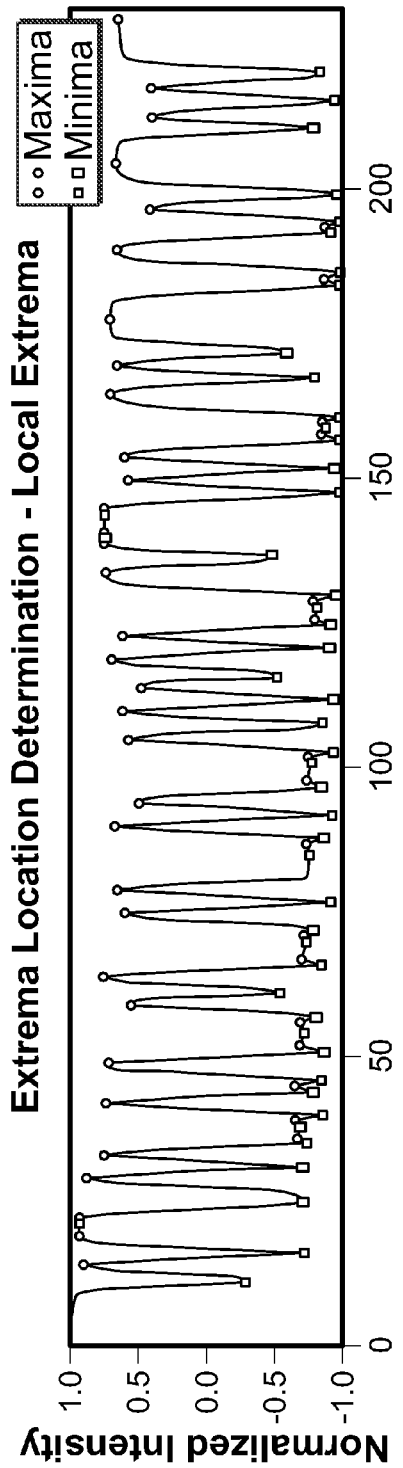
Figure 9B:
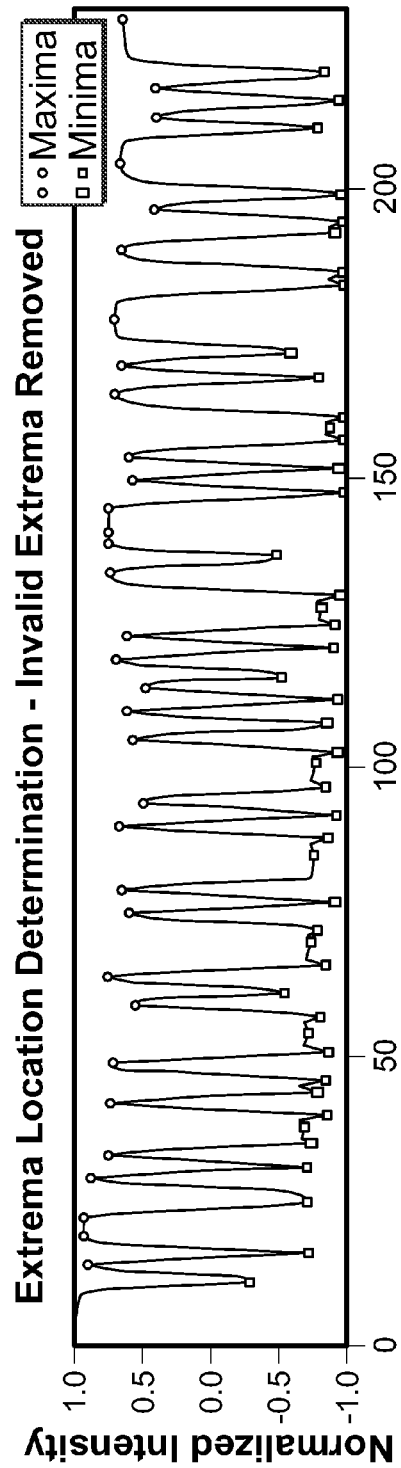

FIGS. 9A-9C are plots illustrating extrema location determination. After the cropping locations are determined, the location and values of the local maxima and minima of the cropped intensity profile can be determined. In some implementations, a preprocessing step can be applied to the cropped profile prior to extrema finding which includes a linear de-trending operation followed by a signal amplitude normalization step. These optional preprocessing steps remove any linear intensity ramp present in the signal due to adverse lighting conditions and keeps the signal amplitude within a known dynamic range, typically [0 . . . 1] or [−1 . . . 1]. FIG. 9A shows the raw unfiltered output of the extrema detection phase. FIG. 9B shows the filtered list of extrema after invalid extrema have been removed. FIG. 9C shows the final output of the extrema filtering phase after local multiples were coalesced into a single maximum or minima.

In some implementations at least two robust techniques for extrema finding can be used. A first technique uses a linear search (e.g., an argmax operator) over a sliding window to determine local extrema. A second technique uses slope filtering to determine when the signal slope undergoes a polarity change. Since slope filtering uses linear regression over a finite window length to fit a linear FIR model to the data, the slope filtering technique can robustly mitigate the adverse effects of noise in the barcode intensity profile. Accordingly, the slope filtering technique can be used under challenging lighting conditions (e.g., low light, high sensor noise). Slope filtering is describe in C. S. Turner, "Slope filtering: An FIR approach to linear regression," IEEE Signal Processing Magazine, vol. 25, no. 6, pp. 159-163 (2008).

Both techniques operate over a short window of the intensity profile. This window length can be picked as a fixed multiple of the fundamental pitch of the intensity profile. The linear search technique is faster than the slope filtering technique. The linear search technique, however, can produce false detections due to being more sensitive to noise. To reduce false detections, the list of detected extrema can be filtered, as described below.

Find Extrema of Cropped Intensity Profile

Ideally there should be one maximum per peak (white bar) and one minimum per valley (black bar) of the bar code intensity profile. Unfortunately, the raw output of the extrema detection step (FIG. 9A) often have invalid extrema. The invalid extrema can be defined as local minima that occur in the high (peak) areas of the intensity profile and local maxima that occur in the low (valley) areas of the intensity profile. Additionally, there can be multiple extrema present each valley or peak. These invalid and superfluous extrema can be removed through a process called extrema filtering.

In some implementations, extrema filtering can include detecting and removing invalid extrema and coalescing multiples of local extrema. First, invalid extrema are removed and then multiple extrema in the same peak or valley of the intensity profile are coalesced into a single maximum or minimum. Invalid extrema are detected using either an adaptive threshold based comparator or an alpha-trimmed outlier detector.

Adaptive Threshold Based Extrema Rejection

The adaptive threshold based comparator sets the classification threshold, $T(x)$, to the mid point between the local signal maximum $h(x)$ and minimum $g(x)$. The comparison threshold $T(x)$ can be determined by calculating the max-min envelope of the intensity profile and then setting the comparison threshold to the middle of this band given by $$T(x) = 0.5*(h(x)+g(x)), \quad [6]$$

with the maxima and minima envelope signals defined as $$h(x) = \max\left\{Y(x+n) \mid n \in \left[-\frac{L_e}{2}, \frac{L_e}{2}\right]\right\}, \quad [7]$$

$$g(x) = \min\left\{Y(x+n) \mid n \in \left[-\frac{L_e}{2}, \frac{L_e}{2}\right]\right\}, \quad [8]$$

where $L_e$ is the width of the window over which the maximum and minimum value is calculated. The extrema can now be compared to this threshold. Maxima that lie below this threshold and minima that lie above this threshold can be rejected.

Alpha-Trimmed Outlier Detection Based Extrema Rejection

This technique first builds a second order statistical model for both the maxima and minima dataset using an alpha-trimmed estimate of the mean and covariance. The datasets can be first sorted and then the top and bottom $100*\alpha$ percent of the datasets can be excluded for the calculation of the mean and variance of the dataset ($\mu$ and $\sigma^2$). Each entry in the full dataset $d_i$ can then be tested to see if it lies further than $k*\sigma$ from the mean. If so, it can be rejected as an outlier. This decision rule can be given by $$(d_i-\mu \geq k\sigma)?\text{reject:accept}, \qquad [9]$$

where $k\in[2,3]$ is a sensitivity meta parameter.

FIG. 9B shows what the extrema of the intensity profile looks like after invalid entries are removed. Notice how certain peaks and valleys of the intensity profile now contain multiple maxima (in the peaks) and multiple minima (in the valleys). A simple linear search over the local set of extrema in a peak or valley can be used to determine the extrema with the largest absolute amplitude. This extrema can be kept and the rest of the extrema discarded.

Find Edges

Given a list of the filtered extrema, the position of the positive and negative edges can be calculated. The edge location can be calculated using a linear interpolation of the pixel x-coordinates of the two intensity profile samples that straddle the mid-value between consecutive maxima and minima. This procedure can include the following steps for each edge between two extrema:

1. Calculate mid-point value between maxima and minima as follows $$\text{mid}_i^y = 0.5*(\text{maximum}_i^y + \text{minimum}_i^y), \qquad [10]$$

where $\text{maximum}_i^y$ is the y-value (normalized intensity) of the ith maximum and $\text{minimum}_i^y$ is the y-value (normalized intensity) of the ith minimum 2. Find the two samples of the intensity profile $Y(x)$ whose amplitude straddles the midpoint value. That is, find $k_i$ such that $Y(k)<\text{mid}_i^y<Y(k+1)$ for positive edges and $Y(k)>\text{mid}_i^y>Y(k+1)$ for negative edges.
3. Calculate real valued $\tilde{k}$ such that $k<\tilde{k}<k+1$ and $\tilde{Y}(\tilde{k})=\text{mid}_i^y$. Here $\tilde{Y}(x)$ is a linear interpolation function between $Y(k)$ and $Y(k+1)$.
4. Set the real valued location of the ith edge to $\tilde{k}$.

Figure 10B:
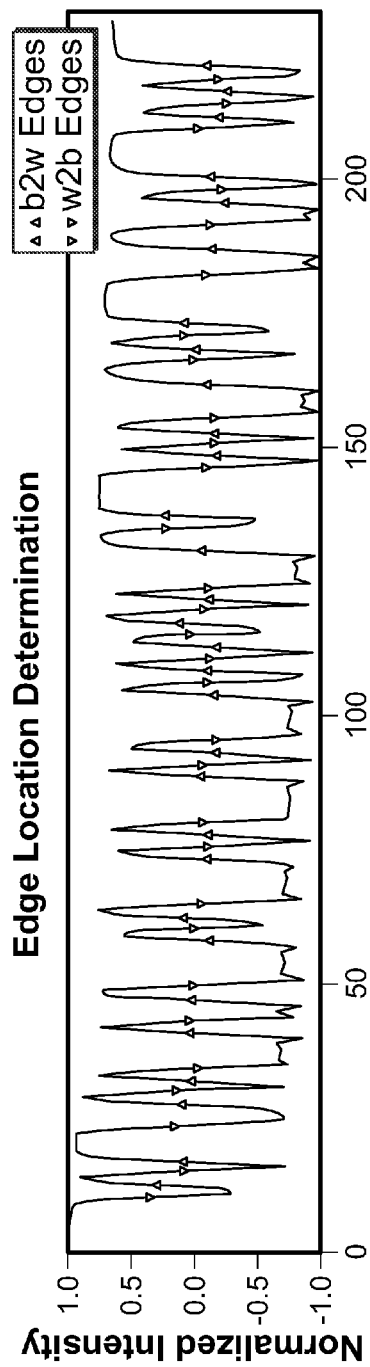

FIGS. 10A and 10B are plots illustrating the calculated edge locations for a typical barcode intensity profile using the technique just described. FIG. 10A shows the intensity profile. FIG. 10B shows a plot of the positive and negative edge locations of a barcode intensity profile, calculated from the filtered list of maxima and minima shown overlaid on the intensity profile in FIG. 10A.

Edge List Consistency Checking

Once the list of positive and negative edges is calculated, the consistency of the list structure can be checked. The purpose of this step is to determine if the list structure is consistent with one of the types of known barcodes the system can decode. First, we check if the number of negative (high-to-low) and positive (low-to-high) edges of the intensity profile corresponds with the expected number for a given barcode type. Within this implementation, the following number of edges can be expected for the four main consumer product barcode types:

EAN-13: 30 positive, 30 negative
EAN-8: 22 positive, 22 negative
UPC-A: 30 positive, 30 negative
UPC-E: 17 positive, 17 negative Second, we determine if the list of edges forms a correctly interleaved set. That is, a negative edge should be followed by a positive edge and vice versa. And lastly, the list should start on a negative (high-to-low, white-to-black) edge and end with a positive (low-to-high, black-to-white) edge. Given a consistency check list of consecutive edges, a linear sequence of symbol feature vectors can be calculated by applying the parameterizations shown in FIGS. 3A-B.

Exemplary Machine Learning Based Decoding

In this section, a general approach is disclosed for implementing the final decoding/mapping step (step 408) of process 400 described in reference to FIG. 4. This step utilizes a data-driven machine learning based classifier. An advantage of this classifier is that the effect of noise and other inaccuracies in the preceding steps of the barcode decoding system are modeled. A noise model is incorporated into the off-line data generation phase which is used to train the classifier-based decoding back-end using supervised learning. This approach significantly increases robustness of the barcode decoder.

Due to the inherent presence of noise in the signal capturing front-end and other non-ideal corrupting influences (e.g., bad lighting, focus, optical distortion, non-planar packaging, user motion, etc.), the resulting calculated feature vector for any given symbol can be distorted from the ideal correct underlying representation. This distortion can be modeled as $$\tilde{\vec{s}}_i = h(\vec{s}_i, \vec{n}_i), \qquad [11]$$

Where $h(\ )$ is some potentially non-linear observation function, $\vec{s}_i = [L_i, x_{i,0}, x_{i,1}, x_{i,2}, x_{i,3}]$ are the symbol feature vectors as defined in reference to FIGS. 3A-3B and $\vec{n}_i$ is a corrupting noise-like random variable. This distortion causes errors in the decoding process if not mitigated in some robust fashion. A simplification of the distortion can be given by $$\begin{aligned}
\tilde{\vec{s}}_i &= \vec{s}_i + \vec{n}_i \\
&= [L_i, x_{i,0}, x_{i,1}, x_{i,2}, x_{i,3}] + \vec{n}_i \\
&= [L_i + n_{i,L}, n_{i,0} + n_{i,0}, x_{i,1} + n_{i,1}, x_{i,2} + n_{i,2}, x_{i,3} + n_{i,3}] \\
&= [\tilde{L}_i, \tilde{x}_{i,0}, \tilde{x}_{i,1}, \tilde{x}_{i,2}, \tilde{x}_{i,3}],
\end{aligned} \qquad [12]$$

which states that each component of the symbol feature vector is corrupted by additive noise drawn from some probability density function. Typical noise models that can be used are Gaussian (white or colored) or uniform distributions.

Classifier Input Features

To make the classification backend scale invariant, the noisy feature vectors of equation [10] can be transformed into a scale invariant form by normalizing each vector with its first component, the absolute length of each symbol, $$\vec{y}_i = \left[\frac{\tilde{x}_{i,0}}{\tilde{L}_i}, \frac{\tilde{x}_{i,1}}{\tilde{L}_i}, \frac{\tilde{x}_{i,2}}{\tilde{L}_i}, \frac{\tilde{x}_{i,3}}{\tilde{L}_i}\right]. \qquad [13]$$

The 4-dimensional feature vector of equation [13] can be used as input to the classification backend.

Classifier Implementation and Training

Figure 11:
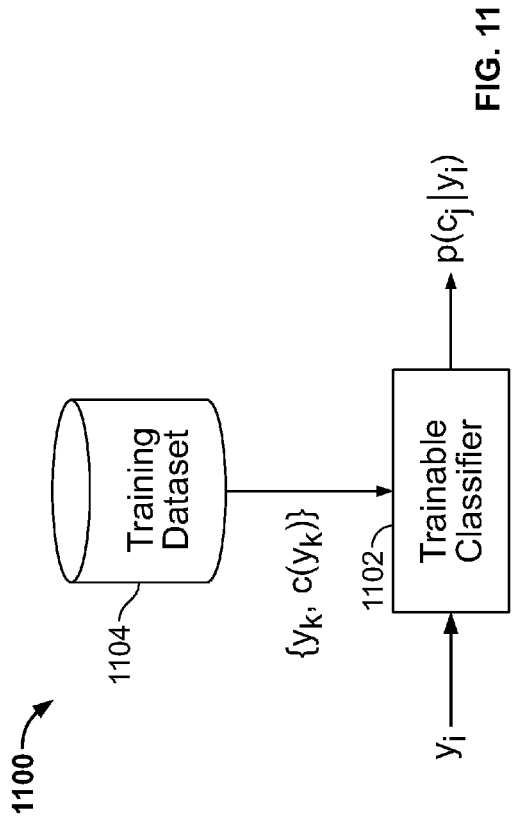
FIG. 11 is a block diagram of an exemplary data-driven classifier based decoding system that can be trained in a supervised fashion using noisy simulated input feature vectors.

FIG. 11 is a block diagram of an exemplary data-driven classifier based decoding system 1100 that can be trained in a supervised fashion using noisy simulated input feature vectors. System 1100 includes a trainable machine-learning based classifier 1102 that is trained in a supervised fashion on datasets generated using the feature vector noise model given by equations [12] and [13]. Classifier 1102 is trained by a dataset including simulated noisy symbol feature vectors with a known target class. An input symbol feature vector generated by the DSP step 406 is input to classifier 1102. The output of classifier 1102 is a posterior probability of an output class given the input feature vector.

The purpose of the classification backend is to map any input feature vector $\vec{y} \in R^n$ to one of the possible output classes corresponding with possible numerical value and parity of the corresponding input barcode digit. That is, classifier 1102 applies a function $f(\ )$ to the input feature vector which maps it onto one of M potential classes $$f(\vec{y}) \to c_j \qquad [14]$$

where $c_j$ is the label of the jth class with $j=[0, 1, \ldots, M-1]$. The function $f(\ )$ in equation [14] can be linear or non-linear. This operation can be repeated for each one of the N input feature vectors $\vec{y}_i$ with $i=[0, 1, \ldots, N-1]$ in the linear sequence of symbol feature vectors generated by the DSP step 406 of FIG. 4.

Specifically, for classifying the input feature vectors given by equation [13] into the integer digits 0 through 9 (even and odd parity), classifier 1102 maps real valued vectors in $R^4$ into one of 20 discrete classes. Classifier 1102 can be any known classifier algorithm, provided the algorithm is trainable in a supervised fashion using a representative training set of input feature vectors and known class labels. Some examples of suitable classifiers include but are not limited to multi-layer neural networks (MLP-NN), radial basis function neural networks (RBF), support vector machines (SVM), and classification and regression trees.

In some implementations, a three layer MLP neural network can be used as a classifier. The three layer MLP neural network can have a 4-7-20 architecture (4 input units, 7 hidden units, 20 output units) and use hyperbolic tangent non-linearities in the input and hidden layers and a one-hot encoded soft-max sigmoid output layer. This allows the real valued outputs of each of the 20 output units to be treated as posterior probabilities of the class conditioned on the input symbol feature vector, $p(c_j | \vec{y}_i)$.

Figure 12:
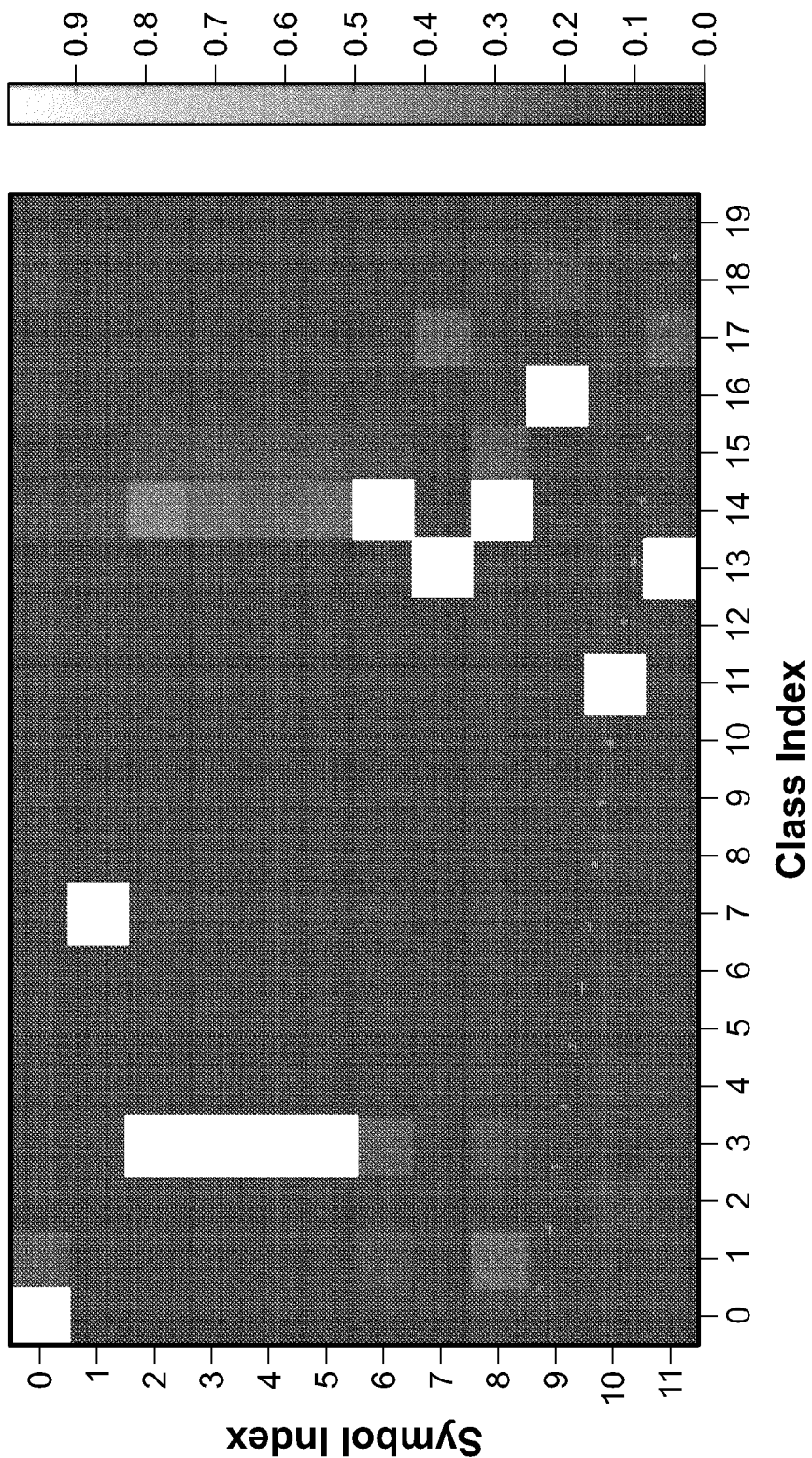
FIG. 12 is a plot illustrating neural network output class probabilities for a sequence of input symbol feature vectors.

FIG. 12 is a plot illustrating neural network output class probabilities for a sequence of input symbol feature vectors. Specifically, FIG. 12 displays a graphical representation of the probabilistic output of the neural network classifier for the decoding of a 12 digit UPC-A barcode. Each row of the 2D plot displays the posterior probabilities of each of the 20 output classes for that specific symbol feature vector in the input sequence. There are 20 classes since each of the ten digits $[0, 1, \ldots, 9]$ can have one of two parities, even or odd, depending on the encoding symbols set.

Referring to FIG. 12, the y-axis indicates the index of the input symbol feature vector in the digit sequence and the x-axis indicates the index of the respective neural network output units. Since a one-hot encoding scheme is used for the output layer, the output units can be treated as actual posterior probabilities of the class given the input $p(c_j | \vec{y}_i)$, where j is the class index and i is the input symbol index (in the input sequence). The brightest spots per input row indicates the output units with the highest output probability. The input sequence presented to the neural network classifier in this example decodes to [0, 7, 3, 3, 3, 3, 4, 3, 4, 6, 1, 3], where the first 6 digits have odd parity (classes 0 through 9) and the last 6 digits have even parity (classes 10 through 19).

Decoding an input symbol feature vector into a barcode digit can be accomplished by applying the input vector to the neural network and picking the output class with the highest posterior probability. Furthermore, an overall confidence score can be computed for the complete decoding of the barcode by averaging the maximum per-symbol output probability for the whole sequence, $$\gamma = \frac{1}{N} \sum_{i=0}^{N-1} \max\{p(c_j | \vec{y}_i) | j \in [0, 1, \ldots, M-1]\}. \qquad [15]$$

The score in equation [15] can be compared against a gating threshold to determine if the quality of a barcode decode is high enough or if it should be rejected.

Exemplary Classifier Training

The neural network classifier 1102 can be trained in a supervised fashion using a regularized scaled conjugate gradient algorithm. For example, cross-validated weight-decay regularization can be used to ensure that the neural network does not over fit the training data. This in turn ensures a robust generalization performance for real-world (post training) use.

The training dataset can be synthesized by generating the symbol feature vectors for the full set of output classes using the barcode symbol parameterization shown in FIGS. 3A-3B and the encoding alphabet shown in FIG. 2.

The size and diversity of the training dataset can be increased Q-fold by generating Q independent random variable noise samples $\vec{n}_i$ for each noiseless input feature vectors $\vec{s}_i$ and then simulating Q new noisy feature vectors $\vec{y}_i$ using equations [12] and [13].

This training dataset captures the real distortions which might be encountered during the imperfect conversion of captured barcode into a symbol feature vector sequence. Training the classifier 1102 on this data with the correct a priori known target classes provides robust real-world performance.

Exemplary Barcode Decoding Process

Figure 13:
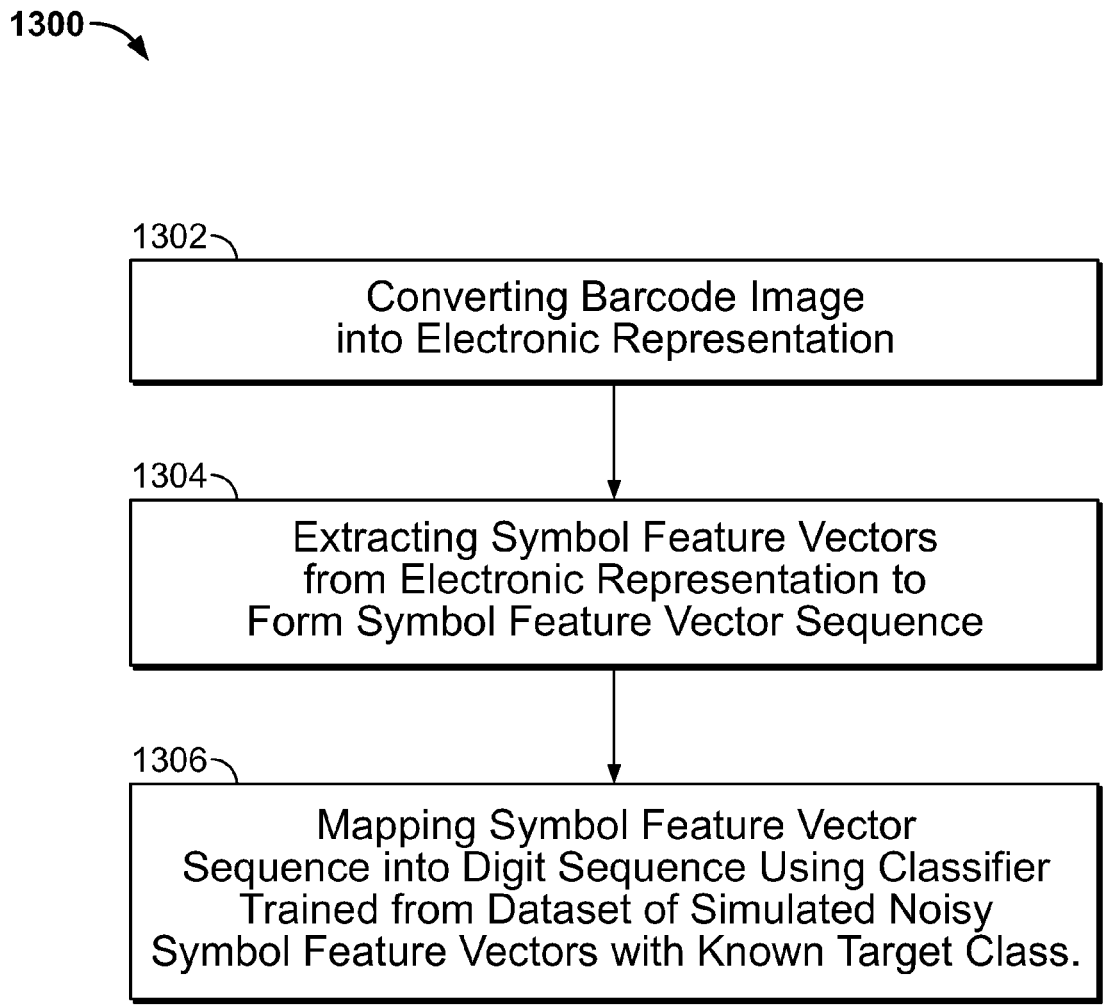
FIG. 13 is an exemplary process for barcode recognition.

FIG. 13 is an exemplary process 1300 for barcode recognition. The process 1300 can begin by converting a barcode image into an electronic representation (1302). The barcode image can be converted as described in reference to FIGS. 1-10. Next, symbol feature vectors are extracted from the electronic representation to form a sequence of symbol feature vectors (1304), as described in reference to FIGS. 1-10 and equations. The symbol feature vectors are then mapped into digit sequence using a classifier trained from a dataset of simulated noisy symbol feature vectors with known target classes (1306), as described in reference to FIGS. 11 and 12.

Exemplary System Architecture

FIG. 14 is a block diagram of an exemplary system architecture implementing the barcode decoding system according to FIGS. 1-13. The architecture 1400 can be implemented on any electronic device that runs software applications derived from compiled instructions, including without limitation personal computers, servers, smart phones, media players, electronic tablets, game consoles, digital cameras, video cameras, email devices, etc. In some implementations, the architecture 1400 can include one or more processors 1402, one or more input devices 1404, one or more display devices 1406, image capture device 1408 and one or more computer-readable mediums 1410. Each of these components can be coupled by bus 1412.

Display device 1406 can be any known display technology, including but not limited to display devices using Liquid Crystal Display (LCD) or Light Emitting Diode (LED) technology. Processor(s) 1402 can use any known processor technology, including but are not limited to graphics processors and multi-core processors. Input device 1404 can be any known input device technology, including but not limited to a keyboard (including a virtual keyboard), mouse, track ball, and touch-sensitive pad or display. Bus 1412 can be any known internal or external bus technology, including but not limited to ISA, EISA, PCI, PCI Express, NuBus, USB, Serial ATA or FireWire. Computer-readable medium 1410 can be any medium that participates in providing instructions to processor(s) 1402 for execution, including without limitation, non-volatile storage media (e.g., optical disks, magnetic disks, flash drives, etc.) or volatile media (e.g., SDRAM, ROM, etc.).

Computer-readable medium 1410 can include various instructions 1414 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 1404; sending output to display device 1406; keeping track of files and directories on computer-readable medium 1410; controlling peripheral devices (e.g., disk drives, printers, etc.) which can be controlled directly or through an I/O controller; and managing traffic on bus 1412. Network communications instructions 1416 can establish and maintain network connections (e.g., software for implementing communication protocols, such as TCP/IP, HTTP, Ethernet, etc.).

An image capture application 1418 can include instructions that operate the image capture device 1408. The image capture device 1408 can be an embedded device or a separate device coupled to system architecture 1400 through a port (e.g., USB, FireWire).

Barcode recognition instructions 1420 can be a barcode recognition application that implements the capture, DSP and decoding processes described in reference to FIGS. 1-13. The barcode recognition instructions 1420 can also be implemented as part of operating system 1414.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method of recognizing a barcode, comprising:
converting a barcode image into an electronic representation;
extracting symbol feature vectors from the electronic representation to form a symbol feature vector sequence; and
mapping the symbol feature vector sequence into a digit sequence, the mapping including using a classifier trained in a supervised manner from a dataset of simulated noisy symbol feature vectors with a known target class.

2. The method of claim 1, further comprising:
generating a one dimensional intensity profile image from a vertical integration of pixel values in a band cutting through the barcode image.

3. The method of claim 2, further comprising:
prior to generating the intensity profile, converting the pixel values from a first color space to a second color space using a color space mapping.

4. The method of claim 2, extracting symbol feature vectors from the electronic representation, further comprises:
cropping left and right edges of the intensity profile;
identifying positions and values of extrema of the intensity profile;
filtering extrema to remove extraneous detections;
calculating locations of edges of the intensity profile using filtered extrema;
performing edge consistency checking; and
sequentially converting consecutive local edge location measurements into a linear sequence of N symbol feature vectors.

5. The method of claim 4, where cropping left and right edges of the intensity profile further comprises:
detecting barcode endpoints using a differential spatial signal variance ratio (DSSVR) metric.

6. The method of claim 4, where identifying positions and values of extrema of the intensity profile further comprises:
applying a linear search over a sliding window to the cropped intensity profile to find local extrema; or
applying slope filtering to the cropped intensity profile to determine when a slope of the intensity profile undergoes a polarity change.

7. The method of claim 4, where identifying positions and values of extrema of the intensity profile further comprises:
applying a linear de-trending operation to the cropped intensity profile; and applying signal amplitude normalization to the cropped and d-trended intensity profile.

8. The method of claim 6, where filtering extrema to remove extraneous detections further comprises:
detecting and removing invalid extrema; and
coalescing multiples of local extrema.

9. The method of claim 8, where detecting invalid extrema further comprises:
applying an adaptive threshold based comparator or an alpha-trimmed outlier detector to the cropped intensity profile.

10. The method of claim 9, calculating locations of edges of intensity profile using filtered extrema further comprises:
calculating edge locations using a linear interpolation of pixel x-coordinates of two intensity profile samples that straddle a mid-value between consecutive maxima and minima extrema.

11. The method of claim 10, calculating locations of edges of intensity profile using filtered extrema further comprises:
calculating edge locations using a linear interpolation of pixel x-coordinates of two intensity profile samples that straddle a mid-value between consecutive maxima and minima extrema.

12. The method of claim 4, where performing edge consistency checking further comprises:
comparing a number of negative and positive edges of the intensity profile with an expected number of negative and positive edges for a given barcode type; and
determining if the edges form a correctly interleaved set.

13. The method of claim 4, where sequentially converting consecutive local edge location measurements into a linear sequence of N symbol feature vectors further comprises:
converting the consecutive local edge location measurements into parameters that encode distances between key fiducial landmarks in the barcode image.

14. The method of claim 1, where the simulated noisy symbol feature vectors are given by $\tilde{\vec{s}}_i = \vec{s}_i + \vec{n}_i$ where $\vec{s}_i$ are the symbol feature vectors and $\vec{n}_i$ is a corrupting noise-like random variable and i=0, 1, ..., N−1, and where N is a positive integer equal to the total number of simulated noisy symbol feature vectors.

15. The method of claim 14, where the simulated noisy symbol feature vectors are given by $\tilde{\vec{s}}_i = [\tilde{L}_i, \tilde{x}_{i,0}, \tilde{x}_{i,1}, \tilde{x}_{i,2}, \tilde{x}_{i,3}]$ and i=0, 1, ..., N−1, $\tilde{L}_i$ is a noisy symbol length measure from the leading edge of a first bar of a symbol in the barcode image to a corresponding leading edge of a first bar of a next adjacent symbol, $\tilde{x}_0$ is a noisy width of a second dark bar of the symbol, $\tilde{x}_1$ is a noisy width of a first dark bar of the symbol, $\tilde{x}_2$ is a noisy distance between trailing edges of the first and second dark bars, and $\tilde{x}_3$ is a noisy distance between leading edges of the first and second dark bars.

16. The method claim 15, where the noisy symbol feature vectors $\vec{s}_i$ are transformed into scale invariant noisy symbol feature vectors by normalizing each component of each vector by $\tilde{L}_i$.

17. The method claim 16, where the classifier is a multi-layer neural network that uses hyperbolic tangent nonlinearities in an input layer and a hidden layer, and a one-hot encoded soft-max sigmoid output layer.

18. The method claim 17, where the multi-layer neural network has 4 input units and 20 output units, and real valued outputs of each of the 20 output units are posterior probabilities of a known class conditioned on an input symbol feature vector.

19. The method claim 17, where the classifier is trained in a supervised fashion using a regularized scaled conjugate gradient.

20. The method of claim 17, further comprising:
computing a confidence score for a complete decoding of the barcode image by averaging a maximum per-symbol output probability for the sequence of symbol feature vectors, and comparing the confidence score against a gating threshold to determine the quality of the decoding of the barcode image.

21. A system for recognizing a barcode, comprising:
one or more processors;
memory coupled to the one or more processors and storing instructions, which, when executed by the one or more processors, cause the processors to perform operations comprising:
converting a barcode image into an electronic representation;

extracting symbol feature vectors from the electronic representation to form a symbol feature vector sequence; and mapping the symbol feature vector sequence into a digit sequence, the mapping including using a classifier trained in a supervised manner from a dataset of simulated noisy symbol feature vectors with a known target class.

22. The system of claim 21, where the memory stores instructions, which, when executed by the one or more processors, cause the processors to perform operations comprising:

generating a one dimensional intensity profile image from a vertical integration of pixel values in a band cutting through the barcode image.

23. The system of claim 22, where the memory stores instructions, which, when executed by the one or more processors, cause the processors to perform operations comprising:

prior to generating the intensity profile, converting the pixel values from a first color space to a second color space using a color space mapping.

24. The system of claim 22, where the memory stores instructions, which, when executed by the one or more processors, cause the processors to perform operations comprising:

cropping left and right edges of the intensity profile;
identifying positions and values of extrema of the intensity profile;
filtering extrema to remove extraneous detections;
calculating locations of edges of intensity profile using filtered extrema;
performing edge consistency checking; and
sequentially converting consecutive local edge location measurements into a linear sequence of N symbol feature vectors.

25. The system of claim 24, where the memory stores instructions, which, when executed by the one or more processors, cause the processors to perform operations comprising:

detecting barcode endpoints using a differential spatial signal variance ratio (DSSVR) metric.

26. The system of claim 24, where the memory stores instructions, which, when executed by the one or more processors, cause the processors to perform operations comprising:

applying a linear search over a sliding window to the cropped intensity profile to find local extrema; or
applying slope filtering to the cropped intensity profile to determine when a slope of the intensity profile undergoes a polarity change.

27. The system of claim 24, where the memory stores instructions, which, when executed by the one or more processors, cause the processors to perform operations comprising:

applying a linear de-trending operation to the cropped intensity profile; and applying signal amplitude normalization to the cropped and d-trended intensity profile.

28. The system of claim 26, where the memory stores instructions, which, when executed by the one or more processors, cause the processors to perform operations comprising:

detecting and removing invalid extrema; and
coalescing multiples of local extrema.

29. The system of claim 28, where the memory stores instructions, which, when executed by the one or more processors, cause the processors to perform operations comprising:

applying an adaptive threshold based comparator or an alpha-trimmed outlier detector to the cropped intensity profile.

30. The system of claim 29, where the memory stores instructions, which, when executed by the one or more processors, cause the processors to perform operations comprising:

calculating edge locations using a linear interpolation of pixel x-coordinates of two intensity profile samples that straddle a mid-value between consecutive maxima and minima extrema.

31. The system of claim 30, where the memory stores instructions, which, when executed by the one or more processors, cause the processors to perform operations comprising:

calculating edge locations using a linear interpolation of pixel x-coordinates of two intensity profile samples that straddle a mid-value between consecutive maxima and minima extrema.

32. The system of claim 24, where the memory stores instructions, which, when executed by the one or more processors, cause the processors to perform operations comprising:

comparing a number of negative and positive edges of the intensity profile with an expected number of negative and positive edges for a given barcode type; and
determining if the edges form a correctly interleaved set.

33. The system of claim 24, where the memory stores instructions, which, when executed by the one or more processors, cause the processors to perform operations comprising:

converting the consecutive local edge location measurements into parameters that encode distances between key fiducial landmarks in the barcode image.

34. The system of claim 21, where the simulated noisy symbol feature vectors are given by $\tilde{\vec{s}}_i = \vec{s}_i + \vec{n}_i$ where $\vec{s}_i$ are the symbol feature vectors and $\vec{n}_i$ is a corrupting noise-like random variable and $i=0, 1, \ldots, N-1$, and where N is a positive integer equal to the total number of simulated noisy symbol feature vectors.

35. The system of claim 34, where the simulated noisy symbol feature vectors are given by $\tilde{\vec{s}}_i = [\tilde{L}_i, \tilde{x}_{i,0}, \tilde{x}_{i,1}, \tilde{x}_{i,2}, \tilde{x}_{i,3}]$ and $i=0, 1, \ldots, N-1$, $\tilde{L}_i$ is a noisy symbol length measure from the leading edge of a first bar of a symbol in the barcode image to a corresponding leading edge of a first bar of a next adjacent symbol, $\tilde{x}_0$ is a noisy width of a second dark bar of the symbol, $\tilde{x}_1$ is a noisy width of a first dark bar of the symbol, $\tilde{x}_2$ is a noisy distance between trailing edges of the first and second dark bars, and $\tilde{x}_3$ is a noisy distance between leading edges of the first and second dark bars.

36. The system claim 35, where the noisy symbol feature vectors are transformed into scale invariant noisy symbol feature vectors by normalizing each component of each vector by $\tilde{L}_i$.

37. The system of claim 36, where the classifier is a multi-layer neural network that uses hyperbolic tangent nonlinearities in an input layer and a hidden layer, and a one-hot encoded soft-max sigmoid output layer.

38. The system claim 37, where the multi-layer neural network has 4 input units, seven hidden units and 20 output units, and real valued outputs of each of the 20 output units are posterior probabilities of a known class conditioned on an input symbol feature vector.

39. The system claim 37, where the classifier is trained in a supervised fashion using a regularized scaled conjugate gradient.

40. The system of claim 37, where the memory stores instructions, which, when executed by the one or more processors, cause the processors to perform operations comprising:
   computing a confidence score for a complete decoding of the barcode image by averaging a maximum per-symbol output probability for the sequence of symbol feature vectors, and comparing the confidence score against a gating threshold to determine the quality of the decoding of the barcode image.

* * * * *

UNITED STATES PATENT AND TRADEMARK OFFICE
CERTIFICATE OF CORRECTION

PATENT NO.       : 8,523,075 B2
APPLICATION NO.  : 12/895751
DATED            : September 3, 2013
INVENTOR(S)      : Rudolph van der Merwe It is certified that error appears in the above-identified patent and that said Letters Patent is hereby corrected as shown below:

On Title Page 2 (Other Publications), Column 2, Line 10:
　　Delete "Nearocomputing" and
　　insert -- Neurocomputing --, therefor.

On Title Page 2 (Other Publications), Column 2, Line 11:
　　Delete "Recogniation" and
　　insert -- Recognition --, therefor.

On Title Page 2 (Other Publications), Column 2, Line 12:
　　Delete "Chalf" and
　　insert -- Chalk --, therefor.

In the Claims

Column 14, Line 19 at Claim 14; replace:
　　"symbol feature vectors given by $\tilde{\bar{s}}_i = \bar{s}_i + \bar{n}_i$ where $\bar{s}_i$ are," with
　　-- symbol feature vectors given by $\tilde{\bar{s}}_i = \bar{s}_i + \bar{n}_i$, where $\bar{s}_i$ are --

Column 14, Line 35 at Claim 16; replace:
　　"16. The method claim 15, where the noisy symbol feature" with
　　-- 16. The method of claim 15, where the noisy symbol feature --

Column 14, Line 40 at Claim 17; replace:
　　"17. The method claim 16, where the classifier is a multi-" with
　　-- 17. The method of claim 16, where the classifier is a multi- --

Signed and Sealed this
Fifth Day of November, 2013

Teresa Stanek Rea
*Deputy Director of the United States Patent and Trademark Office*

CERTIFICATE OF CORRECTION (continued)

Column 14, Line 44 at Claim 18; replace:
"18. The method claim 17, where the multi-layer neural" with
-- 18. The method of claim 17, where the multi-layer neural --

Column 14, Line 49 at Claim 19; replace:
"19. The method claim 17, where the classifier is trained in" with
-- 19. The method of claim 17, where the classifier is trained in --

Column 16, Line 42 at Claim 34; replace:
"symbol feature vectors given by $\tilde{\bar{s}}_i = \bar{s}_i + \bar{n}_i$ where $\bar{s}_i$ are" with
-- symbol feature vectors given by $\tilde{\bar{s}}_i = \bar{s}_i + \bar{n}_i$, where $\bar{s}_i$ are --

Column 16, Line 58 at Claim 36; replace:
"36. The system claim 35, where the noisy symbol feature" with
-- 36. The system of claim 35, where the noisy symbol feature --

Column 16, Line 62 at Claim 37; replace:
"37. The system claim 36, where the classifier is a multi-" with
-- 37. The system of claim 36, where the classifier is a multi- --

Column 16, Line 66 at Claim 38; replace:
"38. The system claim 37, where the multi-layer neural" with
-- 38. The system of claim 37, where the multi-layer neural --

Column 17, Line 4 at Claim 39; replace:
"39. The system claim 37, where the classifier is trained in a" with
-- 39. The system of claim 37, where the classifier is trained in a --